United States Patent
Marupaduga

(10) Patent No.: US 11,277,797 B1
(45) Date of Patent: Mar. 15, 2022

(54) DISABLING UPLINK LEG SWITCHING OF DUAL-CONNECTED DEVICE IN RESPONSE TO LOW BATTERY ENERGY AND HIGH RATE OF UPLINK LEG SWITCHING

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 17/247,596

(22) Filed: Dec. 17, 2020

(51) Int. Cl.
  *H04W 52/02* (2009.01)
(52) U.S. Cl.
  CPC .............................. *H04W 52/0261* (2013.01)
(58) Field of Classification Search
  CPC ..... H04W 88/06; H04W 48/18; H04W 76/15; H04W 52/0209; H04W 52/0261
  See application file for complete search history.

(56) References Cited

U.S. PATENT DOCUMENTS

| 2016/0295515 | A1 | 10/2016 | Cai et al. |
| 2019/0320339 | A1* | 10/2019 | Laselva ............... H04W 52/246 |
| 2020/0367311 | A1* | 11/2020 | Choi ..................... H04W 76/16 |

FOREIGN PATENT DOCUMENTS

EP 28752218 5/2016

* cited by examiner

*Primary Examiner* — Keith Ferguson

(57) ABSTRACT

A method and system for controlling uplink-path switching of a user equipment device (UE) when the UE has at least two co-existing air-interface connections including a first air-interface connection with a first access node and a second air-interface connection with a second access node, where one of the connections defining a primary uplink path of the UE and an uplink-path-switch control process dynamically controls switching which one of the air-interface connections is the UE's primary uplink path. An example method includes (a) detecting that both (i) the switching of which one of the air-interface connections is the UE's primary uplink path has been occurring at a threshold high rate and (ii) the UE's remaining battery energy threshold low, and (b) responsive to at least the detecting, disabling further switching of which one of the air-interface connections is the UE's primary uplink path while the UE maintains the co-existing air-interface connections.

20 Claims, 5 Drawing Sheets

---

DETECT THAT BOTH (i) SWITCHING OF WHICH ONE OF A UE'S CO-EXISTING AIR-INTERFACE CONNECTIONS IS THE PRIMARY UPLINK PATH OF THE UE HAS BEEN OCCURRING AT A RATE THAT IS AT LEAST AS HIGH AS A PREDEFINED THRESHOLD RATE AND (ii) REMAINING BATTERY ENERGY OF THE UE IS AT LEAST AS LOW AS A PREDEFINED THRESHOLD ENERGY LEVEL — 34

RESPONSIVE TO AT LEAST THE DETECTING, DISABLE FURTHER SWITCHING OF WHICH ONE OF THE AIR-INTERFACE CONNECTIONS IS THE PRIMARY UPLINK PATH OF THE UE WHILE THE UE MAINTAINS THE CO-EXISTING AIR-INTERFACE CONNECTIONS — 36

DISABLING UPLINK LEG SWITCHING OF DUAL-CONNECTED DEVICE IN RESPONSE TO LOW BATTERY ENERGY AND HIGH RATE OF UPLINK LEG SWITCHING

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could be configured to provide coverage and service on one or more radio-frequency (RF) carriers. Each such carrier could be frequency division duplex (FDD), with separate frequency channels for downlink and uplink communication, or time division duplex (TDD), with a single frequency channel multiplexed over time between downlink and uplink use. And each such frequency channel could be defined as a specific range of frequency (e.g., in RF spectrum) having a bandwidth (width in frequency) and a center frequency and thus extending from a low-end frequency to a high-end frequency. Further, each carrier could be defined within an industry standard frequency band, by its frequency channel(s) being defined within the frequency band. Examples of such frequency bands include, without limitation, (i) bands 2, 4, 12, 25, 26, 66, 71, and 85, supporting FDD carriers (ii) band 41, supporting TDD carriers, and (iii) bands n258, n260, and n261, supporting FDD and TDD carriers.

The coverage provided by a given access node on a given carrier could also be considered to define a respective "cell". Thus, if an access node provides coverage and service on two carriers, the access node would be providing two cells, one on each carrier. And if two access nodes provide coverage and service on the same carrier as each other, the access nodes would be providing different respective cells than each other, both on the same carrier.

On the downlink and uplink, the coverage of each such cell could define an air interface configured in a specific manner to provide physical resources for carrying information wirelessly between the access node and UEs.

Without limitation, for instance, the air interface could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry reference signals or the like that UEs could measure in order to determine coverage strength, and other resource elements could be reserved to carry other control signaling such as PRB-scheduling directives and acknowledgement messaging from the access node to UEs. And on the uplink, certain resource elements could be reserved to carry random access signaling from UEs to the access node, and other resource elements could be reserved to carry other control signaling such as PRB-scheduling requests, acknowledgement messaging, and channel-quality reports from UEs to the access node.

Overview

When a UE enters into coverage of an example network, the UE could detect threshold strong coverage of an access node on a particular carrier. For instance, the UE could scan for and detect coverage of the access node on the carrier and could determine that reference signal receive power (RSRP) from the access node on that carrier is threshold high. And the UE could then engage in random-access signaling and connection signaling, such as Radio Resource Control (RRC) signaling, with the access node to establish an air-interface connection (e.g., RRC connection) through which the access node will then serve the UE on that carrier. Further, the access node could establish in data storage a context record for the UE, noting the carrier on which the UE is connected and noting associated service information.

In addition, if the UE is not already registered for service with the core network, the UE could transmit to the access node an attach request, which the access node could forward to a core-network controller for processing. And the core-network controller and access node could then coordinate setup for the UE of one or more user-plane bearers, each of which could include (i) an access-bearer portion that extends between the access node and a core-network gateway system that provides connectivity with a transport network and (ii) a data-radio-bearer (DRB) portion that extends over the air between the access node and the UE.

Once the UE is so connected and registered, the access node could then serve the UE in a connected mode over the air-interface connection, managing downlink air-interface communication of packet data to the UE and uplink air-interface communication of packet data from the UE.

For instance, when the core-network gateway system receives user-plane data for transmission to the UE, the data could flow to the access node, and the access node could buffer the data, pending transmission of the data to the UE. With the example air-interface configuration noted above, the access node could then allocate downlink PRBs in an upcoming subframe for carrying at least a portion of the data, defining a transport block, to the UE. And the access node could then transmit to the UE in a control region of that subframe a Downlink Control Information (DCI) scheduling directive that designates the allocated PRBs, and the access node could accordingly transmit the transport block to the UE in those designated PRBs.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry a transport block of the data from the UE and could transmit to the UE a DCI scheduling directive that designates those upcoming PRBs. And the UE could then accordingly transmit the transport block to the access node in the designated PRBs.

Further, as the industry advances from one generation of wireless technology to the next, or in other scenarios, networks and UEs may also support dual-connectivity service, where a UE is served on multiple co-existing connections, perhaps according to different respective RATs.

For instance, a network could include access nodes that provide coverage and service according to a first RAT ("first-RAT access nodes") and access nodes that provide coverage and service according to a second RAT ("second-RAT access nodes"), and a UE positioned concurrently within coverage of both a first-RAT access node and a second-RAT access node could have a first radio configured to engage in service according to the first RAT and a second radio configured to engage in service according to the second RAT. With this arrangement, the UE may be able to establish a first air-interface connection with the first-RAT access node according to the first RAT and a second air-interface connection with the second-RAT access node according to the second RAT, and the access nodes may then concurrently serve the UE over those connections according to their respective RATs, each in the manner discussed above for instance.

Such dual connectivity (or "non-standalone" (NSA) connectivity) could help to facilitate increased peak data-rate of communications, by multiplexing the UE's communications across the multiple air-interface connections. Further or alternatively, dual connectivity may provide other benefits compared with serving a UE on a single connection (as "standalone" (SA) connectivity).

In a representative dual-connectivity implementation, one of the access nodes could operate as a master node (MN), responsible for coordinating setup, management, and teardown of dual-connectivity service for the UE and functioning as an anchor point for RRC signaling and core-network control signaling related to the dual-connected UE. And each of one or more other access nodes could operate as a secondary node (SN) mainly to provide additional connectivity and increased aggregate bandwidth for the UE.

When the UE enters into coverage of such a system, the UE could initially scan for coverage and discover threshold strong coverage of the MN on a given carrier, and the UE could then responsively engage in signaling as discussed above to establish a first air-interface connection with the MN on that carrier and to attach with the network. Further, the MN may also add one or more additional carriers to that first air-interface connection to provide the UE with carrier-aggregation service.

In addition, perhaps having determined from profile data that the UE is dual-connectivity-capable, the MN might then coordinate setup of dual connectivity for the UE.

Coordinating setup of dual connectivity for the UE could involve first identifying an access node to be an SN for the UE, with the identifying being based on measurement reporting from the UE and/or on coverage assumptions. And coordinating setup of the dual connectivity for the UE could then involve engaging in signaling to coordinate setup for the UE of a second air-interface connection between the UE and the identified SN. For instance, the MN could engage in signaling with the SN to arrange for establishment of the second air-interface connection, and the MN could engage in signaling with the UE to cause the UE to access the SN and complete setup of that second air-interface connection. Further, this connection with the SN could likewise be configured to encompass multiple carriers.

In addition, coordinating setup of dual connectivity for the UE could also involve engaging in signaling, for each of one or more bearers established for the UE, to split the bearer so that the MN and SN can then each serve a respective portion of the UE's data communications. For instance, the MN could engage in signaling to establish a bearer split at the core-network gateway system, with one access-bearer leg extending between the gateway system and the MN and another access-bearer leg extending between the gateway system and the SN. Alternatively, the MN could engaging signaling to establish a bearer split at the MN, with the UE's access bearer remaining anchored at the MN and a branch of the access bearer extending between the MN and the SN. And still alternatively, the MN could engage in signaling to establish a bearer split at the SN, with the UE's access bearer being transferred to and anchored at the SN and a branch of the access bearer extending between the SN and the MN.

With dual-connectivity so configured by way of example, the MN and SN could then serve the UE with packet-data communications over their respective connections with the UE, each in the manner discussed above, for instance with a portion of data flowing over the UE's first air-interface connection between the UE and the MN concurrently with another portion of the data flowing over the UE's second air-interface connection between the UE and the SN.

In an example implementation, the UE's downlink user-plane data flow could be split between the UE's two connections. For instance, when the core-network gateway system has packet data destined to the UE, that data could flow over a split bearer like one of those noted above, with the MN ultimately receiving a portion of the data and transmitting that portion of data over the UE's first air-interface connection to the UE, and with the SN ultimately receiving another portion of the data and transmitting that other portion of data over the UE's second air-interface connection to the UE.

As to the uplink, however, to help conserve the UE's transmission power and battery power and/or for other reasons, the UE might be configured by default to operate in a single-connection-uplink mode in which the UE limits its uplink user-plane data flow to just one of the UE's connections, referred to as the UE's "primary uplink path". In that mode, when the UE has packet data to transmit on the transport network, the UE would transmit the data on just the UE's primary uplink path, and the data could then flow over an access bearer from the recipient access node ultimately to the core-network gateway system for output onto the transport network.

Further, upon occurrence of a trigger, such as a threshold high rate of uplink data flow from the UE, the UE could transition from the single-connection-uplink mode to a split-uplink mode in which the UE will split its uplink data flow between its connections. In the split-uplink mode, for instance, when the UE has data to transmit on the transport network, the UE could transmit a portion of that data over its first air-interface connection to the MN, and that data could flow over an access bearer from the MN ultimately to the core-network gateway system for output onto the transport network, and the UE could transmit another portion of the data over its second air-interface connection to the SN, and that data could similarly flow over an access bearer from the SN ultimately to the core-network gateway system for output onto the transport network. In addition, this uplink split could be configured to put a majority of the UE's uplink data flow on the UE's primary uplink path.

In practice, the UE's serving MN could be responsible for controlling which of the UE's connections will be the UE's primary uplink path. In an example implementation, the MN could base this control on a comparison or other consideration of performance of one or more of the UE's connections, keyed to any of various performance metrics.

Without limitation, for instance, the MN could base the control on a consideration of the UE's coverage strength, such as RSRP, respectively on either or each of the UE's connections, such as whether the UE's RSRP on one connection is higher (e.g., threshold higher) than the UE's RSRP on the other connection, or whether the UE's RSRP on a given one of the UE's connections is threshold high enough to justify that connection being the UE's primary uplink path. And the MN could then transmit to the UE an RRC message that indicates which of the UE's connections the UE should use as the UE's primary uplink path, and the UE could responsively set itself could operate accordingly.

With this arrangement, when a UE is dual connected and one of the UE's connections is set as the UE's primary uplink path, the UE's serving MN may engage in an ongoing uplink-path-switch control process to dynamically control whether to reconfigure the UE to make the UE's other connection the UE's primary uplink path.

In this process, for instance, the MN could monitor for and detect when a trigger for such an uplink-path switch occurs, and the MN could respond to occurrence of that uplink-path-switch trigger by directing and thus causing the UE to switch to use the other connection as the UE's primary uplink path. By way of example, the MN could receive RSRP measurement reports from the UE (e.g., periodically and/or in response to occurrence of certain measurement events) for each of the UE's connections, and the MN could deem an uplink-path-switch trigger to occur when the UE reports threshold higher RSRP on a connection that is not the UE's primary uplink path than on the connection that is the UE's primary uplink path. In response to this or another such uplink-path-switch trigger, the MN could then engage in RRC signaling with the UE to cause the UE to implement an uplink path switch. For instance, the MN could then transmit to the UE an RRC connection-reconfiguration message that directs the UE to switch the UE's primary uplink path. And the UE could responsively set itself to operate as directed and could affirmatively respond to the MN with an RRC connection-complete message confirming the uplink-path switch.

Although this uplink-path switching might be useful and desirable as a general matter, doing so in some situations could be problematic. One such situation is where the dual-connected UE has low remaining battery energy and where the UE's primary uplink path has been repeatedly switching, such as where the UE has been repeatedly engaging in back and forth uplink-path switching—perhaps because the UE is experiencing fluctuating RF interference or other coverage issues.

Unfortunately, this repeated uplink-path switching of a dual-connected UE that has low remaining battery energy could have a detrimental impact on the UE's operation. For instance, for each uplink-path switch, the UE may need to engage in RRC signaling with the MN as noted above, and the UE may need to engage in other processing to implement the switch, any or all of which could consume more of the UE's limited remaining battery energy. And this increased battery drain may ultimately lead to the UE disabling certain services, losing connectivity, or possibly shutting down altogether, which could pose a user-experience problem.

The present disclosure provides a technical mechanism that may help to address this.

The disclosed mechanism can apply in a scenario where a UE has dual connectivity including a first connection with a first access node and a second connection with a second access node and where an uplink-path-switch control process dynamically controls reconfiguring the UE to change which one of the UE's connections is the UE's primary uplink path. In that scenario, a computing system could detect that both (i) the UE's primary uplink path has been switching between the UE's connections at a threshold high rate and (ii) the UE has threshold low remaining battery energy. And in response, the computing system could disable the uplink-path-switch control process or otherwise work to prevent further switching of the UE's primary uplink path while the UE continues to be served with the dual connectivity.

In a non-limiting example implementation of this process, where the UE's serving MN orchestrates the uplink-path-switch control process, the computing system could be provided at the MN. In that case, the MN could learn of the UE's remaining battery energy by receiving battery-energy reports from the UE, and the MN could further track the rate at which the UE's uplink path has been switching between the UE's connections. And based on at least these factors in combination, the MN could forgo further application of the uplink-path-switch control process for the dual-connected UE. Alternatively, the computing system could be provided elsewhere, such as at the UE itself, among other possibilities.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of 4G LTE, 5G NR, and 4G-5G dual connectivity, referred to as EUTRA-NR Dual Connectivity (EN-DC).

With EN-DC, a 4G access node (4G evolved Node-B (eNB)) functions as the MN, and a 5G access node (5G next-generation Node-B (gNB)) functions the SN. Thus, a UE would first establish a standalone-4G connection with a 4G eNB, and the 4G eNB could then coordinate setup of EN-DC service for the UE, including setup for the UE of a secondary 5G connection with the 5G gNB. And the 4G eNB and 5G gNB could then concurrently serve the UE over their respective 4G and 5G connections with the UE.

It should be understood, however, that the principles disclosed herein could extend to apply with respect to other scenarios as well, such as with respect to other RATs and other dual-connectivity configurations, including possibly single-RAT dual connectivity and/or dual-connectivity encompassing more than two connections. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations.

Figure 1:
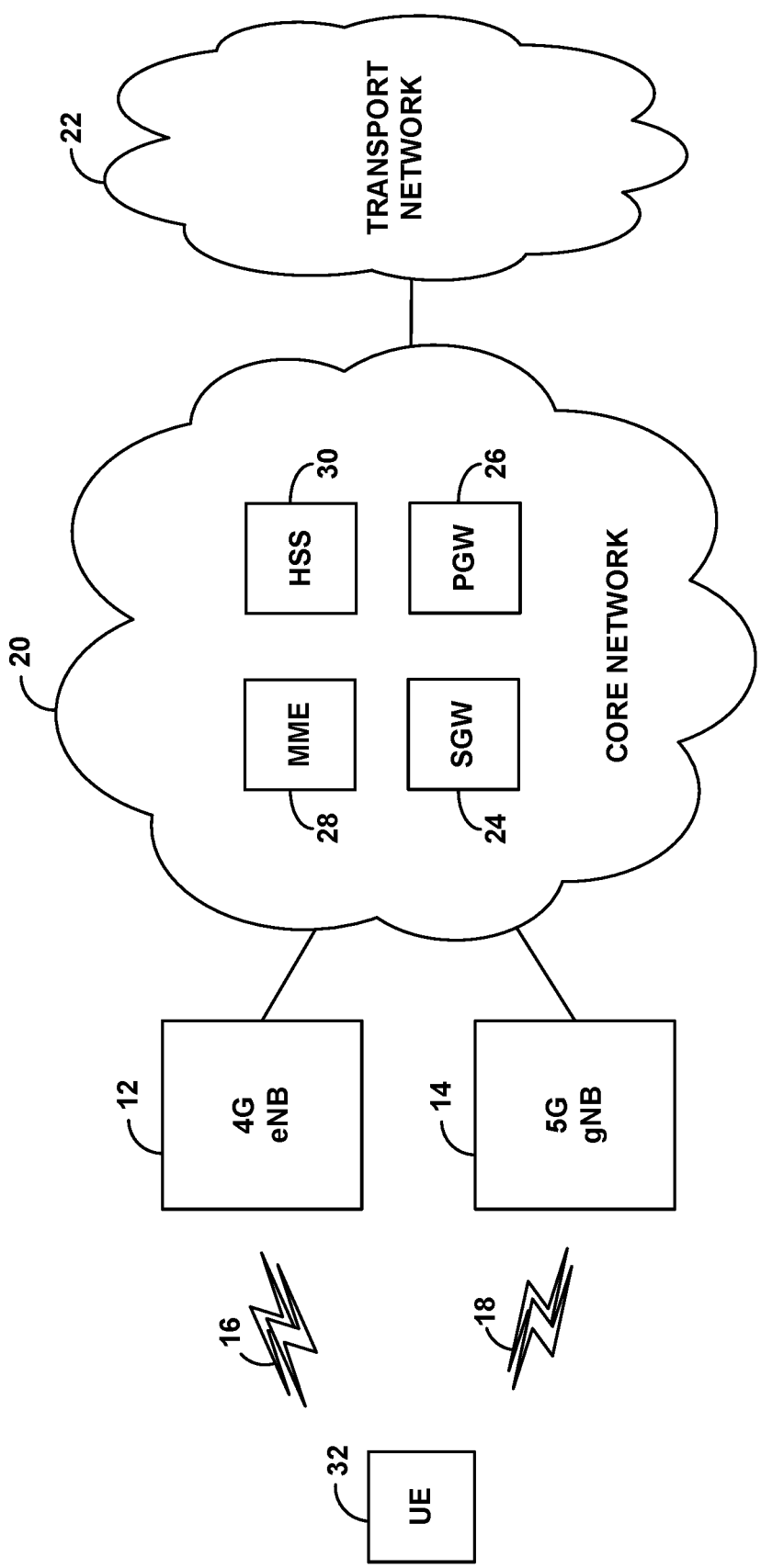
FIG. 1 is a simplified block diagram of an example wireless network arrangement in which various disclosed features can be implemented.

Referring to the drawings, FIG. 1 is a simplified block diagram of an example network arrangement having a 4G eNB 12 and a 5G gNB 14. Each of these access nodes could be macro access nodes of the type configured to provide a wide range of coverage or could take other forms, such as a small cell access node, a relay, a femtocell access node, or the like, possibly configured to provide a smaller range of coverage. Further, the access nodes could be collocated with each other, e.g., at a common cell site with collocated RF points of origin, or could be separately located. Either way, the access nodes could be optimally configured to provide overlapping coverage in order to support EN-DC service.

Each of these access nodes could also be configured to provide coverage and service on one or more carriers, with the access node's coverage on a given carrier defining a respective cell as noted above. In the example shown, for instance, the 4G eNB 12 is configured to provide coverage and service on one or more 4G carriers defining 4G cells 16, and the 5G gNB 14 is configured to provide coverage and service on one or more 5G carriers defining 5G cells 18. Further, in some cases, the access nodes could be configured to share use of one or more carriers.

Each such carrier could be defined in a given frequency band and could be FDD or TDD. And each carrier could have a respective frequency bandwidth on its downlink and/or uplink. For instance, an FDD carrier could have a respective downlink frequency bandwidth and a respective uplink frequency bandwidth. Whereas, a TDD carrier could have a single channel bandwidth for both downlink and uplink, though the downlink-uplink configuration of the TDD carrier could alternatively be considered to scale down the bandwidth of the carrier respectively on the downlink and uplink based on what percentage of time the carrier is downlink versus uplink.

Further, the air interface on each such channel could be structured as described above by way of example, being divided over time into frames, subframes, timeslots, and symbol time segments, and over frequency into subcarriers, thus defining an array of air-interface resource elements grouped into PRBs allocable by the access node as noted above, for use to carry data to or from served UEs. Carrier-structure and/or service on the 4G and 5G air-interfaces, however, could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

As further shown in FIG. 1, each of the illustrated access nodes is interfaced with an example core network 20, which provides connectivity with an external transport network 22 such as the Internet for instance. This core network could be a packet-switched network such as an Evolved Packet Core (EPC) network or Next Generation Core (NGC) core network, among other possibilities, supporting virtual-packet tunnels or other interfaces between network nodes. And the core network could include both a user-plane subsystem through which UE bearer communications could flow to and from the transport network 22, and a control-plane subsystem supporting functions such as UE authentication, mobility management, and bearer management, among others.

In the example arrangement as shown, for instance, the core network 20 could be an EPC network including a serving gateway (SGW) 24, a packet data network gateway (PGW) 26, a mobility management entity (MME) 28, a home subscriber server (HSS) 30, and an element management system (EMS) 32, although other arrangements are possible as well. With this arrangement, the 4G eNB 12 and 5G gNB 14 could each have an interface with the SGW 24, the SGW 24 could have an interface with the PGW 26, and the PGW 26 could provide connectivity with the transport network 22. Further, the 4G eNB 12 could have interfaces with the 5G gNB 14 and with the MME 28, and the MME 28 could have an interface with the SGW 24, to facilitate bearer setup and the like. And still further, the HSS 30 could store or have access to UE profile records, which could specify service-subscription plans, UE configurations, and/or other such UE capability information, such as whether a UE is EN-DC capable for instance.

FIG. 1 also depicts an example UE 32 within coverage of the illustrated access nodes. This UE could take any of the forms noted above, among other possibilities. Further, the UE could be equipped with a 4G LTE radio and a 5G NR radio, as well as associated circuitry and logic to support 4G LTE service, 5G NR service, and EN-DC service. And the UE could be equipped with a rechargeable battery (e.g., one or more such batteries) that stores energy and provides power to drive operations of the UE.

Upon entering into coverage this example system, the UE could scan for 4G coverage and could discover threshold strong coverage of a representative 4G cell 16 provided by 4G eNB 14. In line with the discussion above, the UE could then responsively engage in random access and RRC signaling with the 4G eNB 12 to establish a 4G connection between the UE and the 4G eNB 12 in that 4G cell. Further, the 4G eNB 12 may add one or more other 4G cells 16 to the UE's 4G connection to provide the UE with 4G carrier-aggregation service. And the 4G eNB 12 could establish in data storage a context record for the UE as noted above.

Once the UE is connected with the 4G eNB 12, the UE could then send to the 4G eNB 12 an attach request message, which the 4G eNB 12 could forward to the MME 28 for processing. And upon authenticating and authorizing the UE for service, the MME 28 and 4G eNB 12 could coordinate setup for the UE of at least one user-plane bearer. For instance, the MME 28 could engage in signaling with the 4G eNB 12 and the SGW 24 to coordinate setup for the UE of an S1-U packet tunnel between the 4G eNB 12 and the SGW 24, and the SGW 24 could responsively engage in signaling with the PGW 26 to coordinate setup for the UE of an associated S5 packet tunnel between the SGW 24 and the PGW 26. Further, the 4G eNB 12 could engage in signaling with the UE to establish for the UE an associated data radio bearer.

In addition, in relation to the UE's connection and/or attachment or at another time, the 4G eNB 12 could obtain capability data that indicates various capabilities of the UE, including the UE's support for EN-DC service. For instance, the 4G eNB 12 could obtain this capability data from the UE, or the 4G eNB 12 could obtain this capability data from the MME 28, which could obtain the data from the HSS 30.

As the UE 36 is EN-DC capable, and perhaps responsive to one or more other trigger conditions, the 4G eNB 12 could then work to establish EN-DC service for the UE.

For instance, first the 4G eNB 12 could first direct the UE to scan for 5G coverage, such as by transmitting to the UE an RRC message carrying a "B1" (inter-RAT) measurement object that specifies one or more of the 5G cells 18 provided by the 5G gNB 14 and that specifies per 5G cell a B1 threshold—i.e., an RSRP threshold for deeming 5G coverage of the cell to be sufficiently strong to justify adding secondary connectivity for the UE. And the UE could accordingly scan for 5G coverage and detect threshold strong coverage of one or more such 5G cells 18 and could accordingly transmit to the 4G eNB 12 a B1 measurement report specifying, for each threshold strong 5G cell, an identify of the cell and the threshold strong RSRP that the UE detected from the 5G gNB 14 in the cell.

Operating as the UE's MN (master eNB (MeNB)), the 4G eNB 12 could then engage in signaling to coordinate establishment for the UE a secondary 5G connection with the 5G gNB 14, as the UE's SN (secondary gNB (SgNB)) on the one or more detected/reported 5G cells 18. For example, the 4G eNB 12 could transmit to the 5G gNB 14 an SgNB-Addition request to cause the 5G gNB 14 to allocate resources for a 5G connection for the UE on the one or more 5G cells 18, the 4G eNB 12 could receive an SgNB-Addition-Request acknowledge message from the 5G gNB 14, and the 4G eNB 12 could engage in associated RRC signaling with the UE, in response to which the UE could then access and complete establishment of the 5G connection. Further, the 4G eNB 12 could add to the UE's context record an indication of the 5G cell(s) on which the UE is then connected with the 5G gNB 14. And the 4G eNB 12 could engage in signaling to establish a split bearer, such as to transfer the UE's access bearer (e.g., the UE's S1-U tunnel) to the 5G gNB 14 and to arrange for a bearer split at the 5G gNB 14, among other possibilities.

With EN-DC service configured for the UE, the 4G eNB 12 and 5G gNB 14 could then cooperatively provide the UE with EN-DC service, by concurrently serving the UE, each over its respective connection with the UE and each in the manner discussed above for instance. By way of example, when either access node receives data for transmission to the UE over the UE's connection with the access node, the access node could schedule and engage in transmission of the data in downlink PRBs from the access node to the UE. And when the UE has data to transmit to either access node over the UE's connection with the access node, the access node could schedule and the UE could engage in transmission of the data in uplink PRBs from the UE to the access node.

Further, when the UE is EN-DC-connected, the UE's data flow could be split between the UE's 4G and 5G connections as discussed above. For instance, when user-plane data arrives from the transport network 22 for transmission to the UE, that data may flow over a split access bearer, and the 4G eNB 12 may transmit a portion of the data over the UE's 4G connection to the UE, while the 5G gNB 14 may transmit another portion of the data over the UE's 5G connection to the UE. And when the UE has user-plane data to transmit on the transport network 22, the UE may transmit a portion of the data over its 4G connection to the 4G eNB 12, which may forward the data over an access bearer for transmission directly or indirectly through the core network 20 to the transport network 22, and the UE may transmit another portion of the data over its 5G connection to the 5G gNB 14, which may likewise forward the data over an access bearer for transmission directly or indirectly through the core network 20 to the transport network 22.

And as noted above, the UE could be set to treat one of the UE's connections as the UE's primary uplink path, which could involve restricting the UE's uplink data flow to that connection until the level of data flow rises to a threshold level or other reason exists to offload some of the data flow to the UE's other connection, and/or providing a majority of the UE's uplink data flow on that connection in a split-uplink mode of operation, among other possibilities.

In line with the discussion above, the 4G eNB 12, as the UE's MN, could control which of the UE's connections is set as the UE's primary uplink path. Upon initial establishment of EN-DC for the UE, the UE might default to use a particular one of the UE's connections (e.g., the UE's 5G connection) as the UE's primary uplink path, or the 4G eNB 12 may decide by default or based on one or more factors which of the UE's connections should be the UE's primary uplink path and may instruct and thus cause the UE to operate accordingly. Further, as discussed above, while the UE is served with EN-DC, the 4G eNB 12 could then apply an uplink-path-switch control process, to dynamically control which of the UE's connections will be set as the UE's primary uplink path.

Without limitation, as discussed above, an example uplink-path-switch control process could involve the 4G eNB 12 monitoring performance of either or both of the UE's connections and determining based on the monitored performance whether to direct the UE to switch the UE's primary uplink path from the connection currently set as the UE's primary uplink path to the UE's other connection. The 4G eNB 12 could thus monitor to detect when an uplink-path-switch trigger occurs and, in response to occurrence of that uplink-path-switch trigger, could then transmit to the UE an RRC connection-reconfiguration message that directs and thus causes the UE to engage in the uplink path switch, in response to which the UE could then accordingly switch its primary uplink path and then affirmatively respond to the 4G eNB 14 with an RRC connection-complete message.

Further, as noted above, the performance at issue could relate to coverage strength, such as RSRP. For example, an uplink-path-switch trigger could be that the UE's RSRP on the connection that is not currently set as the UE's primary uplink path is threshold higher than the UE's RSRP on the connection currently set as the UE's primary uplink path. Or an uplink-path-switch trigger could be that the UE's RSRP on the connection currently set as the UE's primary uplink path is threshold low or that the UE's RSRP on the connection not currently set as the UE's primary uplink path is threshold high. To facilitate this, the UE could provide measurement reports to the 4G eNB 12 as discussed above, which could indicate the UE's RSRP respectively per connection and/or could specifically indicate when the UE has threshold higher RSRP on one connection than on the other, among other possibilities. Other uplink-path-switch triggers, whether or not RSRP related, could be considered as well.

As indicated above, the present disclosure addresses a problematic situation where this or another such uplink-path-switch control process results in a threshold high rate of repeated switching of the UE's primary uplink path between the UE's connections (e.g., a high rate of back and forth switching between the UE's 4G connection and the UE's 5G connection) at a time when the UE has threshold low remaining battery energy—as that uplink path switching could contribute to further drain of the UE's battery energy, which could in turn lead to associated issues.

In accordance with the disclosure as noted above, a computing system could monitor for the occurrence of this situation and, in response to detecting occurrence of the situation, could disable further switching of the UE's primary uplink path while the UE continues to be served with dual-connectivity. Further, this disabling of the UE's uplink path switching could be temporary, perhaps until occurrence of a reversion trigger such as the computing system detecting that the UE's connectivity changes and/or that the UE's battery energy is no longer threshold low, among other possibilities, at which point the computing system could responsively revert to once again allowing switching of the UE's primary uplink path.

The computing system that carries out this process could be implemented as part of one or more entities in the arrangement shown in FIG. 1, among other possibilities. In line with the discussion above, for instance, the computing system could be provided at the 4G eNB 12 and/or at the UE 32.

To facilitate detecting a threshold high rate of repeated back and forth switching of the UE's primary uplink path at a time when the UE has threshold low remaining battery energy, the computing system could monitor both (i) the rate at which the UE's primary uplink path has been switching and (ii) the UE's remaining battery energy. Namely, the computing system could monitor for a situation where both (i) the rate at which the UE's primary uplink path has been switching is threshold high and (ii) the UE's remaining battery energy is threshold low. The computing system could monitor for both of these conditions in parallel, or the computing system could monitor for one condition and, upon detecting occurrence of that condition, could then monitor for occurrence of the other condition existing currently.

Monitoring the rate at which the UE's primary uplink path has been switching between the UE's connections could involve tracking instances of those switches along with associated timestamps and, based on the tracking, maintaining a running average number of such switches per unit time, perhaps over a sliding window of time. Detecting when the rate at which the UE's primary uplink path has been switching is threshold high could then involve determining when the monitored running average over a most recent sliding window of time is at least as high as a threshold high uplink-path-switching rate predefined for present purposes as being problematically high.

As the 4G eNB 12 controls the uplink-path-switching process in the example implementation, the 4G eNB 12 could carry out this monitoring and detecting. For instance, the 4G eNB 12 could store in the UE context record timestamped records of the UE's uplink path switching and could regularly monitor those records to detect when the rate of uplink path switching is threshold high. Alternatively, as the UE itself engages in the uplink-path switching, the UE could conduct this monitoring and detecting.

Further, monitoring the UE's remaining battery energy could involve monitoring data representing the UE's remaining battery energy. And detecting when the UE's remaining battery energy is threshold low could involve determining when the monitored remaining battery energy is at least as low as a threshold battery energy level predefined for present purposes as being problematically low.

In practice, the UE's battery could be rated or configured to store up to a maximum amount of energy, which could be measured in units of energy such as ampere-hours (Ah), milliampere-hours (mAh), voltage (V), or the like. And as the UE consumes this battery energy, at any given time the UE will thus have a remaining battery energy level (or state of charge) defining the amount of energy remaining in the UE's battery, which could be quantified as a number of units of energy and/or as a percentage of the battery's maximum energy capacity, among other possibilities.

The UE could regularly monitor its remaining battery energy level, using any battery-energy-monitoring technique now known or later developed. For example, the UE could apply a voltmeter to measure the open circuit voltage at terminals of its battery and could deem its remaining battery energy level to be the measured battery voltage. Alternatively, the UE could apply coulomb counting, integrating a quantity of electrical charge injected into or withdrawn from the battery over time, and could deem the remaining battery energy level to be a percentage of the battery's maximum charge capacity. Other examples are possible as well.

Through this monitoring while the UE is dual connected with the 4G eNB 12 and the 5G gNB 14, the UE could detect when the UE's remaining battery energy is threshold low. Further, the UE could report to the 4G eNB 12 the UE's remaining battery energy level, and/or an indication of whether the UE's remaining battery energy is threshold low. For instance, the UE could report its remaining battery energy level to the 4G eNB 12 periodically and/or at other times, such as whenever the UE sends a scheduling request to the 4G eNB 12 and/or in response to a query from the 4G eNB 12 or in response to the UE detecting that its remaining battery energy level has dropped to a threshold low level, in response to the UE detecting that its remaining battery energy level has risen back up (e.g., through recharging) to a level that is not threshold low, and so forth. And based on this reporting, the 4G eNB 12 could likewise detect when the UE's remaining battery energy is threshold low.

In response to detecting that the rate of the UE's uplink-path switching is threshold high at a time when the UE has threshold low remaining battery energy, the computing system could then take various actions to disable further switching of the UE's uplink path.

By way of example, if the 4G eNB 12 detects this problematic situation, the 4G eNB 12 could responsively set itself to not apply the uplink-path-switch control process for the UE. For instance, the 4G eNB 12 could responsively discontinue monitoring to determine when an uplink-path-switch trigger occurs for the UE, such comparing performance of the UE's connections to determine if an uplink path switch would be justified. And/or the 4G eNB 12 could set itself to forgo directing the UE to carry out an uplink path switch even if and when the 4G eNB 12 detects occurrence of an uplink-path-switch trigger for the UE. Alternatively, if the UE detects this problematic situation, the UE could responsively set itself to not carry out an uplink-path switch even when directed by the 4G eNB 12 to do so, and perhaps to not respond to a directive from the 4G eNB 12 to engage in an uplink path switch. Other examples could be possible as well.

Figure 2:
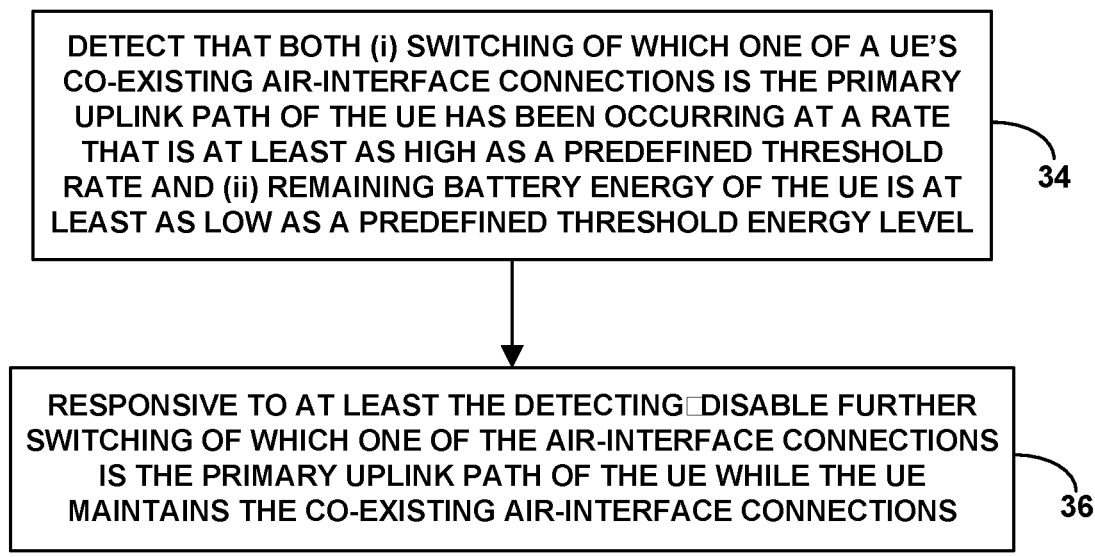
FIG. 2 is a flow chart depicting an example method in accordance with the disclosure.

FIG. 2 is a flow chart depicting a method that could be carried out in accordance with the present disclosure to control uplink-path switching of a UE when the UE has at least two co-existing air-interface connections including a first air-interface connection with a first access node and a second air-interface connection with a second access node, where one of the air-interface connections defines a primary uplink path of the UE, and where an uplink-path-switch control process dynamically controls switching which one of the air-interface connections is the primary uplink path of the UE.

As shown in FIG. 2, at block 34, the method includes detecting that both (i) the switching of which one of the air-interface connections is the primary uplink path of the UE has been occurring at a rate that is at least as high as a predefined threshold rate and (ii) remaining battery energy of the UE is at least as low as a predefined threshold energy level. And at block 36, the method includes, responsive to at least the detecting, disabling further switching of which one of the air-interface connections is the primary uplink path of the UE while the UE maintains the at least two co-existing air-interface connections.

As noted above, the UE could restrict, to the one air-interface connection defining the UE's primary uplink path, uplink user-plane transmission from the UE unless and until a trigger condition causes the UE to split the uplink user-plane transmission between the first and second air-interface connections.

Further, in line with the discussion above, the act of detecting that the switching of which one of the air-interface connections is the primary uplink path of the UE has been occurring at a rate that is at least as high as the predefined threshold rate could involve detecting that a number of instances of the switching that have been occurring per unit time is at least as high as a predefined threshold number of instances. And the act of detecting that the switching of which one of the air-interface connections is the primary uplink path of the UE has been occurring at a rate that is at least as high as the predefined threshold rate could involve detecting that the switching has been occurring back and forth between the first air-interface connection and the second air-interface connection at at least the predefined threshold rate.

In addition, as discussed above, the act of detecting that the remaining battery energy of the UE is at least as low as the predefined threshold energy level could be based on battery-energy-level reporting from the UE.

As further discussed above, the method could be carried out by the first access node, and the first access node could disable the further uplink path switching in various ways.

For instance, the first access node may normally apply the uplink-path-switch control process to dynamically control switching which one of the air-interface connections is the primary uplink path of the UE, in which case disabling further switching of which one of the air-interface connections is the primary uplink path of the UE comprises could involve discontinuing application by the first access node of the uplink-path-switch control process for the UE.

Further, according to the uplink-path-switch control process, the first access node may normally monitor for occurrence of an uplink-path-switch trigger for switching which one of the air-interface connections is the primary uplink path of the UE. And in that case, disabling further switching of which one of the air-interface connections is the primary uplink path of the UE could involve discontinuing monitoring by the first access node for occurrence of the uplink-path-switch trigger.

Still further, according to the uplink-path-switch control process, the first access node may normally respond to occurrence of an uplink-path-switch trigger by directing the UE to switch which one of the air-interface connections is the primary uplink path of the UE. And in that case, disabling further switching of which one of the air-interface connections is the primary uplink path of the UE could involve the first access node forgoing directing of the UE to switch which one of the air-interface connections is the primary uplink path of the UE even when the uplink-path-switch trigger occurs.

Yet further, as discussed above, the method could be carried out by the UE.

In addition, as discussed above, the act of disabling further switching of which one of the air-interface connections is the primary uplink path of the UE while the UE maintains the at least two co-existing air-interface connections could be temporary. For instance, the method could additionally include responding to occurrence of a reversion trigger by automatically reverting to allow further switching of which one of the air-interface connections is the primary uplink path of the UE.

Figure 3:
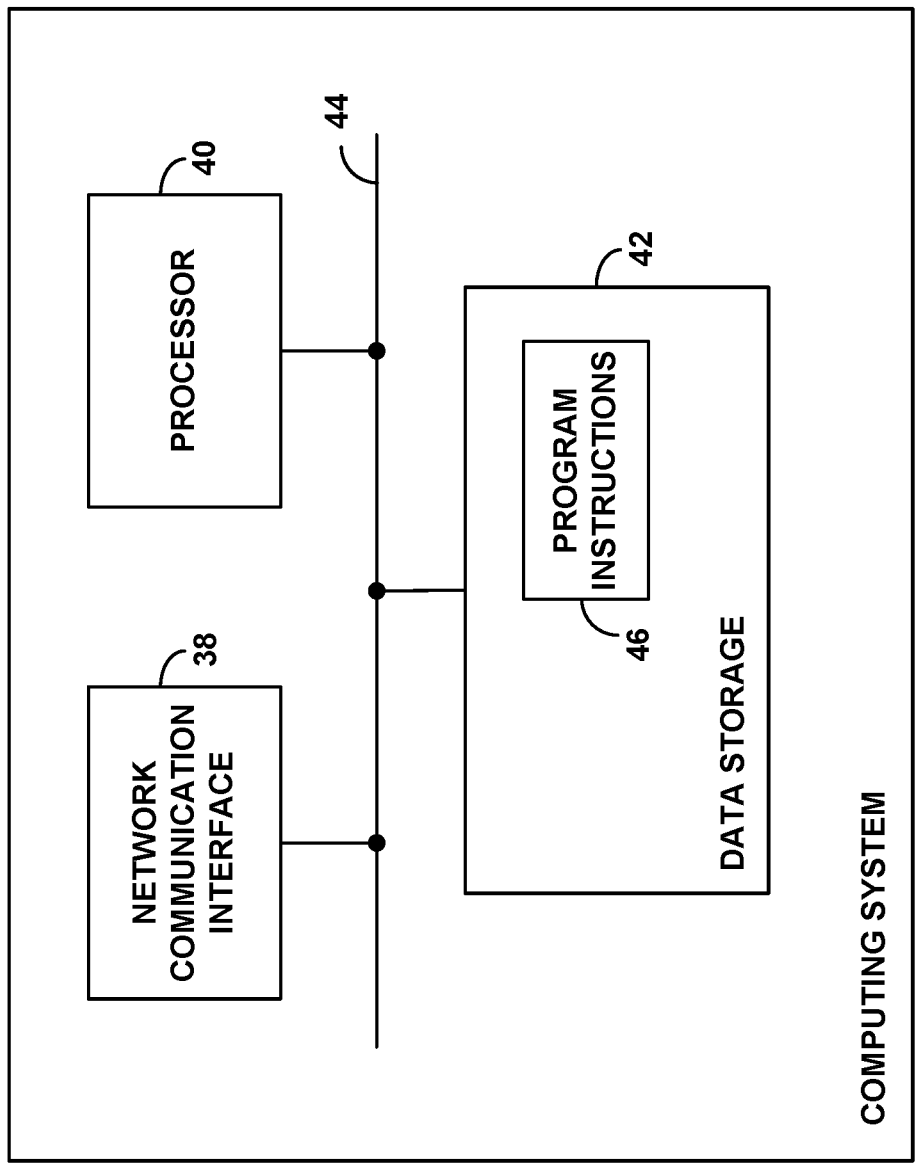
FIG. 3 is a simplified block diagram of an example computing system operable in accordance with the disclosure.

FIG. 3 is next a simplified block diagram of an example computing system that could be operable in accordance with the present disclosure to control uplink-path switching of a UE when the UE has at least two co-existing air-interface connections including a first air-interface connection with a first access node and a second air-interface connection with a second access node, where one of the air-interface connections defines a primary uplink path of the UE, and where an uplink-path-switch control process dynamically controls switching which one of the air-interface connections is the primary uplink path of the UE. As noted above, such a computing system could be provided at or more of the entities shown in FIG. 1, among other possibilities.

As shown in FIG. 3, the example computing system includes at least one network communication interface 38, at least one processor 40, and at least one non-transitory data storage 42, which could be integrated together and/or interconnected by a system bus, network, or other connection mechanism 44.

The at least one network communication interface 38 could comprise a physical network connector (e.g., an Ethernet interface) and associated communication logic (e.g., protocol stacks) to facilitate wired or wireless network communication with various other entities. The at least one processor 40 could comprise one or more general purpose processors (e.g., microprocessors) and/or one or more specialized processors (e.g., application specific integrated circuits). And the at least one non-transitory data storage 42 could comprise one or more volatile and/or non-volatile storage components (e.g., magnetic, optical, or flash storage, necessarily non-transitory).

As shown, the at least one non-transitory data storage 42 could then store program instructions 46. These program instructions could be executable by the at least one processor 40 to cause the computing system to carry out various operations described herein, including but not limited to the operations discussed above in relation to FIG. 2.

Various other features discussed herein can be implemented in this context as well, and vice versa.

Figure 4:
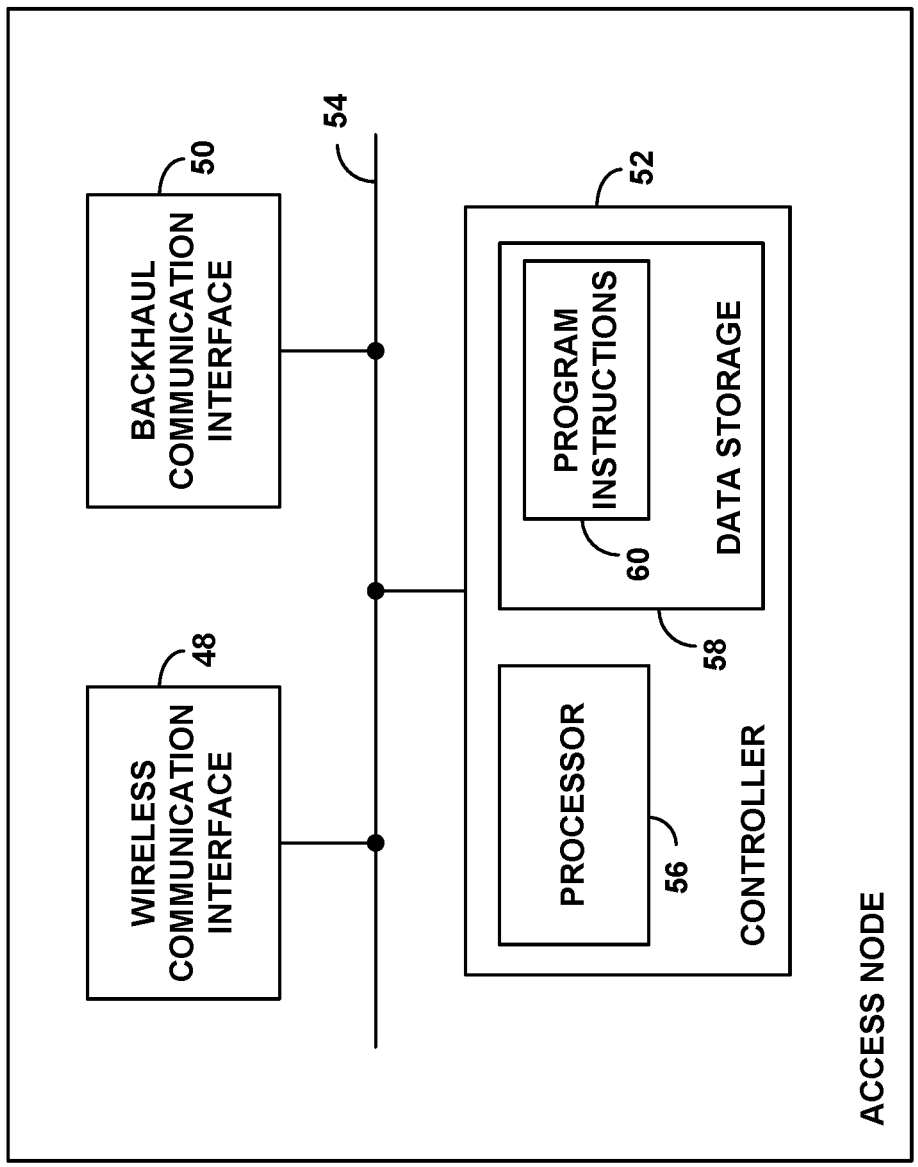
FIG. 4 is a simplified block diagram of an example access node operable in accordance with the disclosure.

FIG. 4 is next a simplified block diagram of an example first access node that could be operable in accordance with the present disclosure to control uplink-path switching of a UE when the UE has at least two co-existing air-interface connections including a first air-interface connection with the first access node and a second air-interface connection with a second access node, where one of the air-interface connections defines a primary uplink path of the UE, and where an uplink-path-switch control process dynamically controls switching which one of the air-interface connections is the primary uplink path of the UE.

As shown in FIG. 4, the example first access node includes at least one wireless communication interface 48, at least one backhaul communication interface 50, and at least one controller 52, all of which could be integrated together and/or communicatively linked together by a system bus, network, or other connection mechanism 54.

In an example implementation, the at least one wireless communication interface 48 could comprise an antenna structure, which could be tower mounted or could take other forms, and associated components such as a power amplifier and a wireless transceiver, so as to facilitate providing coverage on one or more carriers and serving the UE over the first air-interface connection. And the at least one backhaul communication interface 50 could comprise network communication interface such as an Ethernet interface, through which the first access node engages in backhaul communication.

Further, the at least one controller 52 could comprise at least one processor 56 (e.g., one or more general purpose processors and/or one or more specialized processors) programmed to cause the first access node to carry out various operations such as those discussed herein. For instance, the at least one controller 52 could comprise at least one non-transitory data storage 58 (e.g., one or more magnetic, optical, or flash storage components, necessarily non-transitory) which could store program instructions 60 executable by the at least one processor to cause the first access node to carry out such operations.

Various other features discussed herein can be implemented in this context as well, and vice versa.

Figure 5:
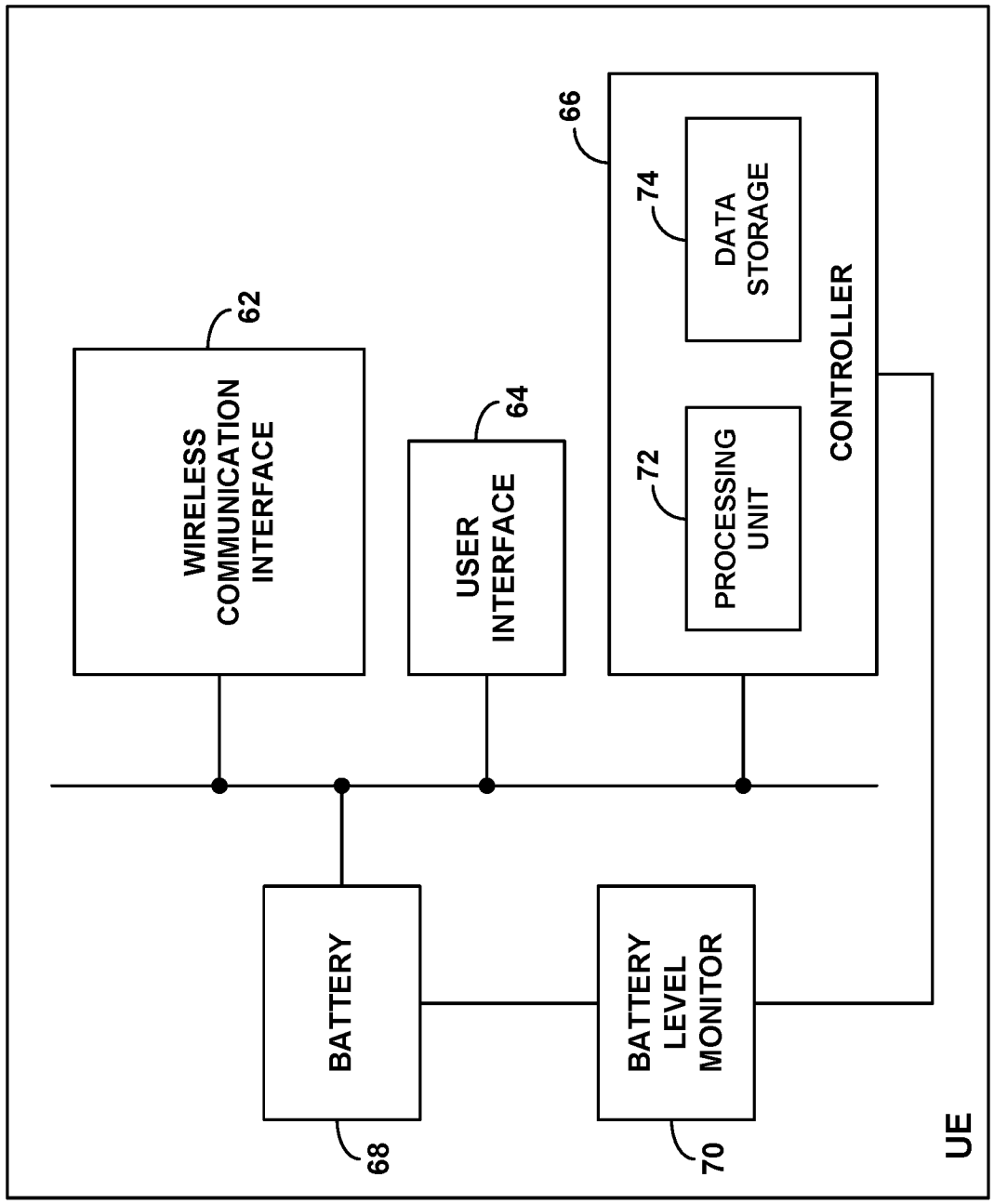
FIG. 5 is a simplified block diagram of an example UE operable in accordance with the disclosure.

Finally, FIG. 5 is a simplified block diagram of an example UE, showing some of the components that could be included to facilitate carrying out operations as described herein.

As shown in FIG. 5, the example UE includes a wireless communication interface 62, a user interface 64, a controller 66, a battery 68, and a battery level monitor 70. These components could be interconnected, integrated, and/or communicatively linked together in various ways now known or later developed. For simplicity, the figure generally depicts the battery 68 being interconnected with the wireless communication interface 62, user interface 64, and controller 66, and the figure generally depicts the battery level monitor 70 being interconnected with the battery 68 and the controller 66. Numerous other arrangements are also possible.

Wireless communication interface 62 could comprise modems and other RF circuitry enabling the UE to engage in air interface communication concurrently over two air-interface connections as discussed above. And user interface 64, which could be included if the UE is user operated, could include input and output components to facilitate interaction with a user. For instance, the user interface could include analog-to-digital conversion circuitry and could include input components such as a touch screen, microphone, and keypad, and output components such as a display screen and sound speaker.

Controller 66, which could be integrated with wireless communication interface 62 (e.g., on a common chipset) or provided in another manner could operate to carry out or cause the UE to carry out various UE operations described herein. As shown, controller 66 could include a processor 72 (e.g., one or more general purpose processors such as microprocessors and/or one or more special purpose processors such as application specific integrated circuits), and non-transitory data storage 74 (e.g., one or more volatile and/or non-volatile storage components, such as magnetic, optical and/or flash storage). And non-transitory data storage 74 could hold program instructions, which could be executable by the processor 72 to carry out the various UE operations.

Battery 68 could be configured to provide energy to support operation of the example UE when the example UE is not connected with another energy source, and the battery could be rechargeable. Further, the battery 68 could take various forms, examples of which include nickel metal hydride (NiMH), nickel cadmium (NiCd), Lithium Ion (Li-Ion), and lithium polymer (Li-Poly), or others now known or later developed.

Battery level monitor 70 could operate to regularly monitor the remaining battery energy level of battery 68 and to provide an output signal indicating a latest determined remaining battery energy level, which the processing unit could report via the wireless communication interface 66 to a serving access node as discussed above. As such, battery level monitor 70 could take various forms as discussed above, such as a voltmeter or a coulomb counter, among other possibilities. Further, the battery level monitor 70 could be integrated with the battery 68 itself or could be provided separately and interconnected with the battery.

Various features described above can be carried out in this context as well, and vice versa.

The present disclosure also contemplates at least one non-transitory computer readable medium (e.g., one or more magnetic, optical, of flash storage components, necessarily non-transitory) having stored thereon (e.g., being encoded with) or otherwise containing program instructions executable by a processor to carry out various operations as described herein.

Exemplary embodiments have been described above. Those skilled in the art will understand, however, that changes and modifications may be made to these embodiments without departing from the true scope and spirit of the invention.

What is claimed is:

1. A method for controlling uplink-path switching of a user equipment device (UE) when the UE has at least two co-existing air-interface connections including a first air-interface connection with a first access node and a second air-interface connection with a second access node, wherein one of the air-interface connections defines a primary uplink path of the UE, and wherein an uplink-path-switch control process dynamically controls switching which one of the air-interface connections is the primary uplink path of the UE, the method comprising:

- detecting that both (i) the switching of which one of the air-interface connections is the primary uplink path of the UE has been occurring at a rate that is at least as high as a predefined threshold rate and (ii) remaining battery energy of the UE is at least as low as a predefined threshold energy level; and
- responsive to at least the detecting, disabling further switching of which one of the air-interface connections is the primary uplink path of the UE while the UE maintains the at least two co-existing air-interface connections.

2. The method of claim 1, wherein the UE restricts, to the one air-interface connection defining the UE's primary uplink path, uplink user-plane transmission from the UE unless and until a trigger condition causes the UE to split the uplink user-plane transmission between the first and second air-interface connections.

3. The method of claim 1, wherein detecting that the switching of which one of the air-interface connections is the primary uplink path of the UE has been occurring at a rate that is at least as high as the predefined threshold rate comprises detecting that a number of instances of the switching that have been occurring per unit time is at least as high as a predefined threshold number of instances.

4. The method of claim 1, wherein detecting that the switching of which one of the air-interface connections is the primary uplink path of the UE has been occurring at a rate that is at least as high as the predefined threshold rate comprises detecting that the switching has been occurring back and forth between the first air-interface connection and the second air-interface connection at at least the predefined threshold rate.

5. The method of claim 1, wherein detecting that the remaining battery energy of the UE is at least as low as the predefined threshold energy level is based on battery-energy-level reporting from the UE.

6. The method of claim 1, wherein the method is carried out by the first access node,
- wherein the first access node normally applies the uplink-path-switch control process to dynamically control switching which one of the air-interface connections is the primary uplink path of the UE, and
- wherein disabling further switching of which one of the air-interface connections is the primary uplink path of the UE comprises discontinuing application by the first access node of the uplink-path-switch control process for the UE.

7. The method of claim 1,
- wherein the method is carried out by the first access node,
- wherein, according to the uplink-path-switch control process, the first access node normally monitors for occurrence of an uplink-path-switch trigger for switching which one of the air-interface connections is the primary uplink path of the UE, and
- wherein disabling further switching of which one of the air-interface connections is the primary uplink path of the UE comprises discontinuing monitoring by the first access node for occurrence of the uplink-path-switch trigger.

8. The method of claim 1,
- wherein the method is carried out by the first access node,
- wherein, according to the uplink-path-switch control process, the first access node normally responds to occurrence of an uplink-path-switch trigger by directing the UE to switch which one of the air-interface connections is the primary uplink path of the UE, and
- wherein disabling further switching of which one of the air-interface connections is the primary uplink path of the UE comprises the first access node forgoing directing of the UE to switch which one of the air-interface connections is the primary uplink path of the UE even when the uplink-path-switch trigger occurs.

9. The method of claim 1, wherein the method is carried out by the UE.

10. The method of claim 1, wherein the disabling further switching of which one of the air-interface connections is the primary uplink path of the UE while the UE maintains the at least two co-existing air-interface connections is temporary.

11. The method of claim 10, further comprising responding to a reversion trigger by automatically reverting to allow further switching of which one of the air-interface connections is the primary uplink path of the UE.

12. A computing system configured to control uplink-path switching of a user equipment device (UE) when the UE has at least two co-existing air-interface connections including a first air-interface connection with a first access node and a second air-interface connection with a second access node, wherein one of the air-interface connections defines a primary uplink path of the UE, and wherein an uplink-path-switch control process dynamically controls switching which one of the air-interface connections is the primary uplink path of the UE, the computing system comprising:

- at least one processor;
- at least one non-transitory data storage; and
- program instructions stored in the at least one non-transitory data storage and executable by the at least one processor to cause the computing system to carry out operations including:
  - detecting that both (i) the switching of which one of the air-interface connections is the primary uplink path of the UE has been occurring at a rate that is at least as high as a predefined threshold rate and (ii) remaining battery energy of the UE is at least as low as a predefined threshold energy level, and
  - responsive to at least the detecting, disabling further switching of which one of the air-interface connections is the primary uplink path of the UE while the UE maintains the at least two co-existing air-interface connections.

13. The computing system of claim 12, wherein the UE restricts, to the one air-interface connection defining the UE's primary uplink path, uplink user-plane transmission from the UE unless and until a trigger condition causes the UE to split the uplink user-plane transmission between the first and second air-interface connections.

14. The computing system of claim 12, wherein the computing system is at least partially at the first access node.

15. The computing system of claim 12, wherein the computing system is at least partially at the UE.

16. The computing system of claim 12, wherein detecting that the switching of which one of the air-interface connections is the primary uplink path of the UE has been occurring at a rate that is at least as high as the predefined threshold rate comprises detecting that the switching has been occurring back and forth between the first air-interface connection and the second air-interface connection at at least the predefined threshold rate.

17. The computing system of claim 12, wherein detecting that the remaining battery energy of the UE is at least as low as the predefined threshold energy level is based on battery-energy-level reporting from the UE.

18. The computing system of claim 12, wherein the disabling further switching of which one of the air-interface connections is the primary uplink path of the UE while the UE maintains the at least two co-existing air-interface connections is temporary.

19. A first access node operable to control uplink-path switching of a user equipment device (UE) when the UE has at least two co-existing air-interface connections including a first air-interface connection with the first access node and a second air-interface connection with a second access node, wherein one of the air-interface connections defines a primary uplink path of the UE, and wherein an uplink-path-switch control process dynamically controls switching which one of the air-interface connections is the primary uplink path of the UE, the computing system comprising:
  at least one a wireless communication interface including an antenna structure through which to serve the UE over the first air-interface connection;
  at least one backhaul communication interface through which the engage in backhaul communication; and
  at least one controller, wherein the at least one controller is configured to cause the first access node to carry out operations including:
    detecting that both (i) the switching of which one of the air-interface connections is the primary uplink path of the UE has been occurring at a rate that is at least as high as a predefined threshold rate and (ii) remaining battery energy of the UE is at least as low as a predefined threshold energy level, and
    responsive to at least the detecting, disabling further switching of which one of the air-interface connections is the primary uplink path of the UE while the UE maintains the at least two co-existing air-interface connections.

20. The first access node of claim 19, wherein the at least one controller comprises at least one processor, at least one non-transitory data storage, and program instructions stored in the at least one non-transitory data storage and executable by the at least one processor to cause the first access node to carry out the operations.

\* \* \* \* \*